United States Patent
Gousset-Rousseau

(10) Patent No.: US 10,502,384 B2
(45) Date of Patent: Dec. 10, 2019

(54) OPTICAL ASSEMBLY COMPRISING REFLECTORS PROVIDED WITH DISCONTINUITIES

(71) Applicant: VALEO VISION, Bobigny (FR)

(72) Inventor: Simon Gousset-Rousseau, Bobigny (FR)

(73) Assignee: VALEO VISION, Bobigny (FR)

(*) Notice: Subject to any disclaimer, the term of this patent is extended or adjusted under 35 U.S.C. 154(b) by 57 days.

(21) Appl. No.: 15/950,289

(22) Filed: Apr. 11, 2018

(65) Prior Publication Data

US 2018/0292063 A1    Oct. 11, 2018

(30) Foreign Application Priority Data

Apr. 11, 2017 (FR) ...................................... 17 53167

(51) Int. Cl.
| | |
|---|---|
| *F21S 41/33* | (2018.01) |
| *F21S 41/36* | (2018.01) |
| *F21S 41/40* | (2018.01) |
| *F21S 41/25* | (2018.01) |
| *G02B 19/00* | (2006.01) |

(Continued)

(52) U.S. Cl.
CPC ............ *F21S 41/33* (2018.01); *F21S 41/148* (2018.01); *F21S 41/25* (2018.01); *F21S 41/255* (2018.01); *F21S 41/336* (2018.01); *F21S 41/36* (2018.01); *F21S 41/365* (2018.01); *F21S 41/40* (2018.01); *G02B 5/09* (2013.01); *G02B 19/0019* (2013.01); *G02B 19/0047* (2013.01)

(58) Field of Classification Search
CPC .. F21S 41/25; F21S 41/33; F21S 41/36; F21S 41/40; F21S 41/148; F21S 41/255; F21S 41/336; F21S 41/365; G02B 19/0019; G02B 19/0047; G02B 5/09
See application file for complete search history.

(56) References Cited

U.S. PATENT DOCUMENTS

| | | | |
|---|---|---|---|
| 4,825,343 | A | 4/1989 | Nakata |
| 4,914,747 | A | 4/1990 | Nino |

(Continued)

FOREIGN PATENT DOCUMENTS

| | | |
|---|---|---|
| EP | 0 254 746 A1 | 2/1988 |
| FR | 2 773 604 A1 | 7/1999 |

(Continued)

OTHER PUBLICATIONS

French Preliminary Search Report dated Jan. 25, 2018 in French Application 17 53167 filed on Apr. 11, 2017 (with English Translation of Categories of Cited Documents).

*Primary Examiner* — Thomas M Sember

(74) *Attorney, Agent, or Firm* — Oblon, McClelland, Maier & Neustadt, L.L.P.

(57) ABSTRACT

An optical module, particularly for a motor vehicle, including a light source emitting light rays; a projection optic having an optical axis and an object focal point $F_L$; a reflector including two cavities each including a reflection surface for reflecting the light rays originating from the light source towards the projection optic; a cut-off device designed to mask part of the light beam, the cut-off device including a transverse cut-off edge, the cut-off edge being arranged at the object focal point $F_L$ of the projection optic.

20 Claims, 4 Drawing Sheets

(51) Int. Cl.
 *G02B 5/09* (2006.01)
 *F21S 41/255* (2018.01)
 *F21S 41/365* (2018.01)
 *F21S 41/148* (2018.01)

(56) References Cited

U.S. PATENT DOCUMENTS

| | | |
|---|---|---|
| 6,431,736 B1 | 8/2002 | Saladin |
| 2012/0039083 A1 | 2/2012 | Meyrenaud |
| 2013/0343076 A1 | 12/2013 | Nakada et al. |

FOREIGN PATENT DOCUMENTS

| | | |
|---|---|---|
| FR | 2 944 578 A1 | 10/2010 |
| WO | WO 2016/190165 A1 | 12/2016 |

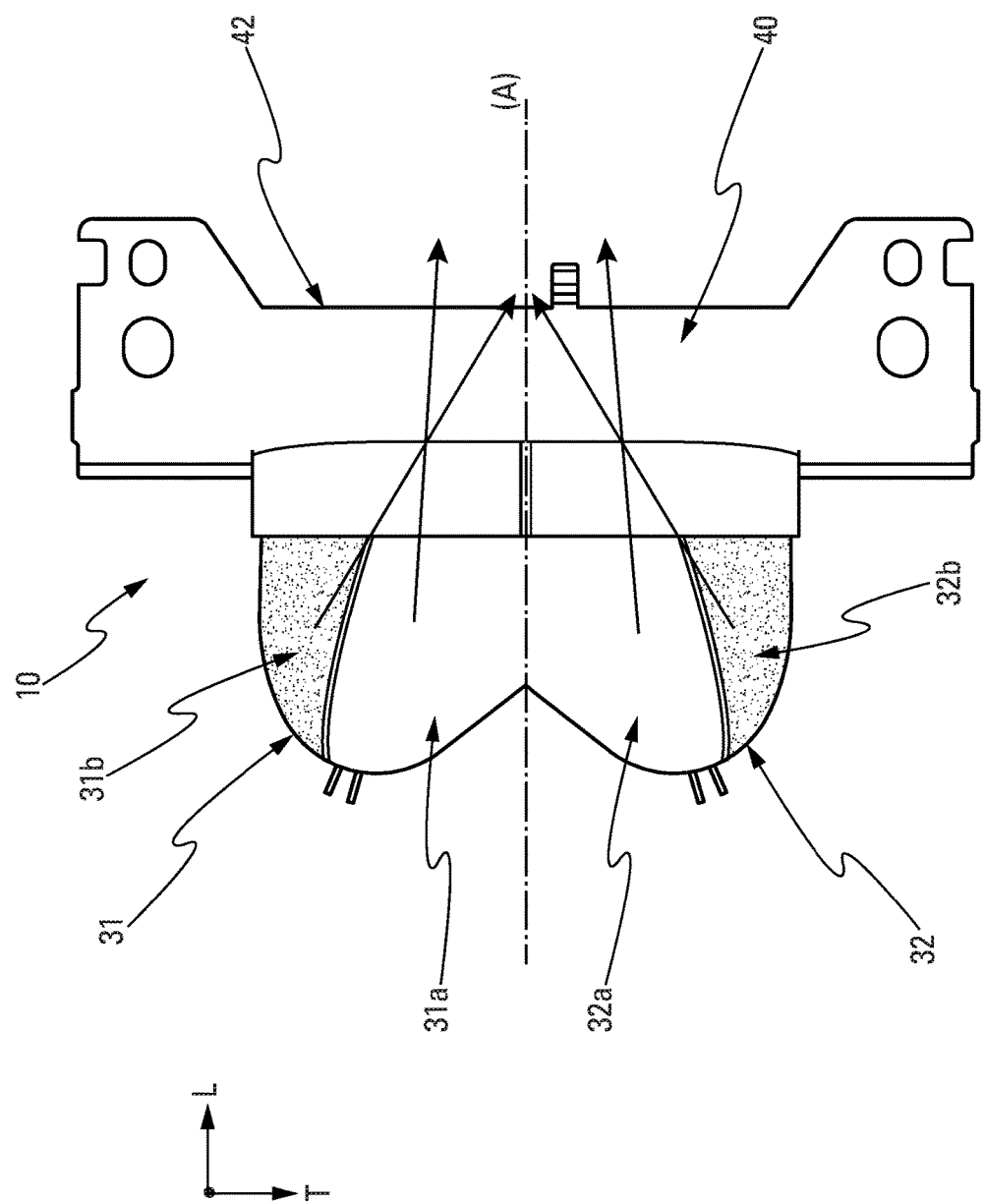

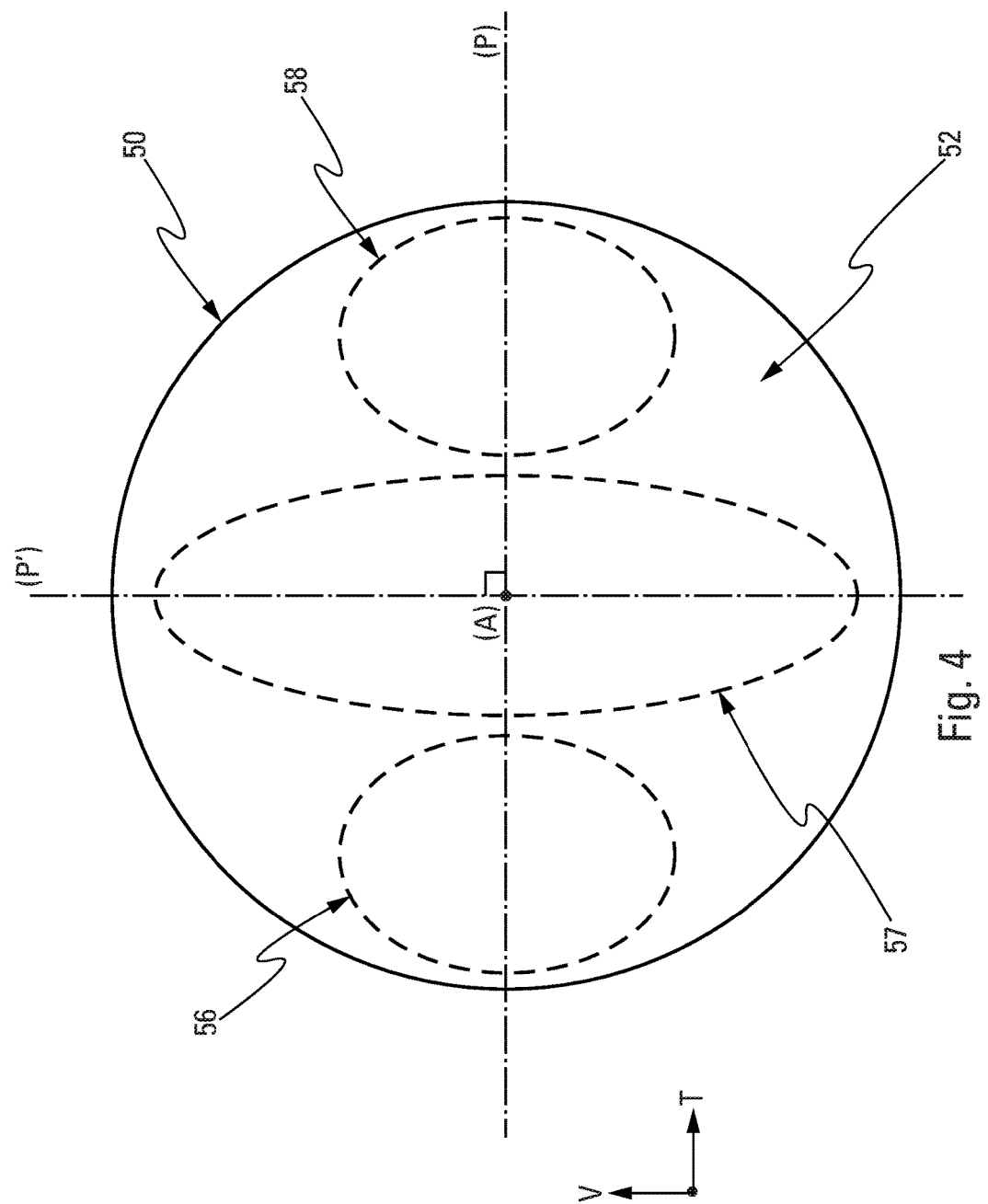

OPTICAL ASSEMBLY COMPRISING REFLECTORS PROVIDED WITH DISCONTINUITIES

TECHNICAL FIELD OF THE INVENTION

The invention relates to the technical field of optical modules, particularly for a motor vehicle.

PRIOR ART

Optical modules for a motor vehicle are known that comprise a light source, reflectors and a projection lens. Furthermore, these optical modules generally comprise a cut-off device comprising a cut-off edge and particularly allowing part of the beam projected by the projection lens to be masked.

Known reflectors comprise three cavities, including a central cavity arranged along the optical axis of the projection lens and two lateral cavities transversely arranged on either side of the central cavity. The central cavity then has a function of illuminating ad infinitum, whereas the lateral cavities fulfill a function of illuminating the width of the road.

In order to provide greater compactness, optical modules are known in which the reflector comprises only two cavities, each cavity itself having two different but related optical surfaces and being separated by a discontinuity. These optical modules enable greater compactness to be provided, whilst allowing the central and width-wise illuminating functions to be fulfilled.

However, one of the disadvantages of these optical modules is that they generate optical aberrations, particularly chromatic aberrations, when the projection lens forms the image of a sharp-contrast object, such as the cut-off edge. These optical aberrations are particularly generated by the passage of light rays in the vicinity of the upper and lower edges of the projection lens. The particular effect of these chromatic aberrations is the generation of an image that is blurred or has iridescent contours, which can impede the driver.

BRIEF SUMMARY OF THE INVENTION

One of the objects of the invention is to overcome the aforementioned problem. To this end, the invention proposes an optical module, particularly for a motor vehicle, comprising:
a light source emitting light rays;
a projection optic having an optical axis and an object focal point $F_L$;
a reflector comprising two cavities each comprising a reflection surface for reflecting the light rays originating from the light source towards the projection optic;
a cut-off device designed to mask part of the light beam, the cut-off device comprising a transverse cut-off edge, the cut-off edge being arranged at the object focal point $F_L$ of the projection optic,
each of the cavities being arranged on either side of an axial plane P' comprising the optical axis, the reflection surface of each cavity being divided into a lateral part and a central part of the cavity, the central part of each cavity being arranged along the axial plane P', the lateral part of each cavity being transversely located at a distance from the axial plane, each reflection surface having a single object focal point that coincides with the light source,
characterized in that the lateral part of each cavity has a single image focal point coinciding or substantially coinciding with the object focal point of the projection optic, and
the central part of each cavity comprises a plurality of image focal points distinct from the object focal point of the projection optic,
the cavities being designed so that the light rays reflected by the central parts of the reflector pass through a central part of the projection optic, the central part of the projection optic extending in the vicinity of an intersection between the projection optic and the plane P',
the light rays reflected by the lateral parts of the reflector passing through two lateral parts of the projection optic transversely located on either side of the central part of the projection optic.

According to various embodiments of the invention, which can be taken in combination or separately:
the reflection surfaces of the cavities are symmetrical or substantially symmetrical relative to the plane P';
the plane P' is a longitudinal vertical plane;
the cut-off device is a reflective plate comprising a reflective surface, particularly coinciding with an axial plane P transverse and perpendicular to the plane P', designed to reflect part of the light rays from the cavities towards the projection optic;
the light source has a main emission axis perpendicular to the plane P;
the cut-off device is a shield designed to stop the propagation of part of the light rays towards the projection optic;
the image focal points of the central parts of each cavity are substantially aligned along the optical axis;
the optical module comprises two light sources, each light source emitting a light beam respectively towards one or the other of the cavities;
the lateral part and the central part of each cavity each have an ellipsoid shape;
the optical module is designed so that the light rays passing via the lateral parts of each cavity propagate parallel to the optical axis after they pass via the projection optic so as to illuminate ad infinitum, the light rays passing via the central parts of each cavity being projected in a direction that is not parallel to the optical axis after they pass via the projection optic so as to laterally illuminate on either side of the plane.

BRIEF DESCRIPTION OF THE FIGURES

The invention will be better understood, and further aims, details, features and advantages thereof will become more clearly apparent throughout the following detailed description of at least one embodiment of the invention, which is provided solely by way of an illustrative and non-limiting example, with reference to the accompanying drawings, in which:

FIG. 3 is a top schematic view of part of the optical module, according to the invention;

FIG. 4 is a schematic view of the inlet face of the projection optic of the optical module, according to the invention.

DETAILED DESCRIPTION

Hereafter, and in a non-limiting manner, longitudinal, vertical and transverse orientations will be adopted, which are shown by the "L, V, T" trihedron in the figures. The vertical orientation is used herein by way of a geometric reference without any relation to the direction of gravity.

The invention relates to an optical module 10, particularly for a motor vehicle. The optical module 10 is, for example, intended to be installed in a motor vehicle in order to illuminate the road. In particular, the optical module 10 is designed to be assembled in a front headlight of a motor vehicle. The optical module 10 in this case is designed to produce an illuminating light beam with longitudinal and forwards cut-off, intended to fulfill a low beam function, for example.

Figure 1:
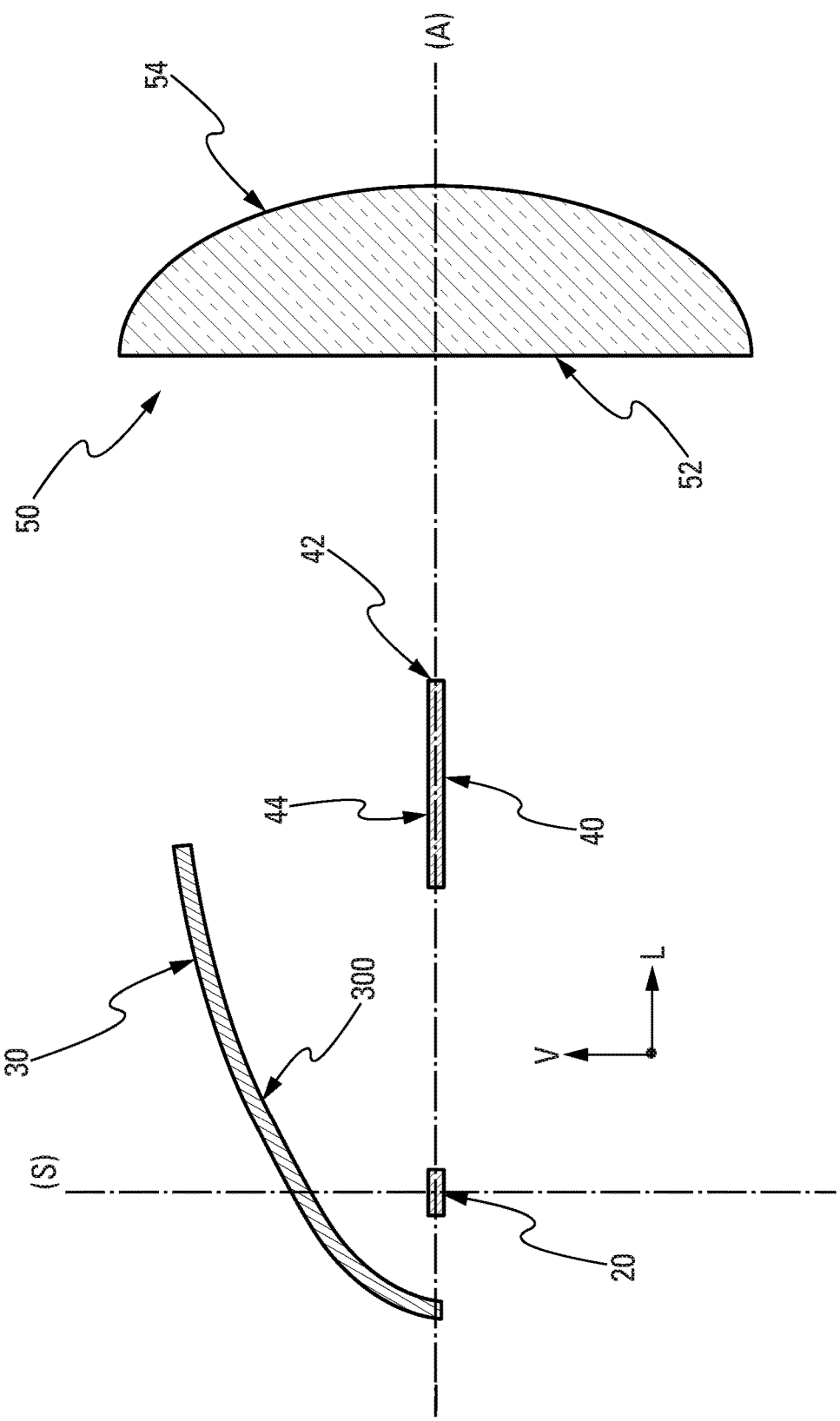
FIG. 1 is a schematic view of a vertical section of the optical module passing via the optical axis, according to the invention.

As shown in FIG. 1, the optical module 10 in this case comprises a light source 20, a reflector 30, a cut-off device 40 and a projection optic 50.

In this case, the light source 20 has a main vertical emission axis S. It is designed to emit light beams towards the reflector 30. By way of a variant, not shown herein, the optical module can comprise a plurality of light sources.

The reflector 30, the cut-off device 40 and the projection optic 50 are substantially arranged one after the other and in this order along the path of the light beams emitted by the light source 20.

The optical module 10 is designed so that the light beams emitted by the light source 20 are reflected by the reflector 30 towards the projection optic 50.

Figure 2:
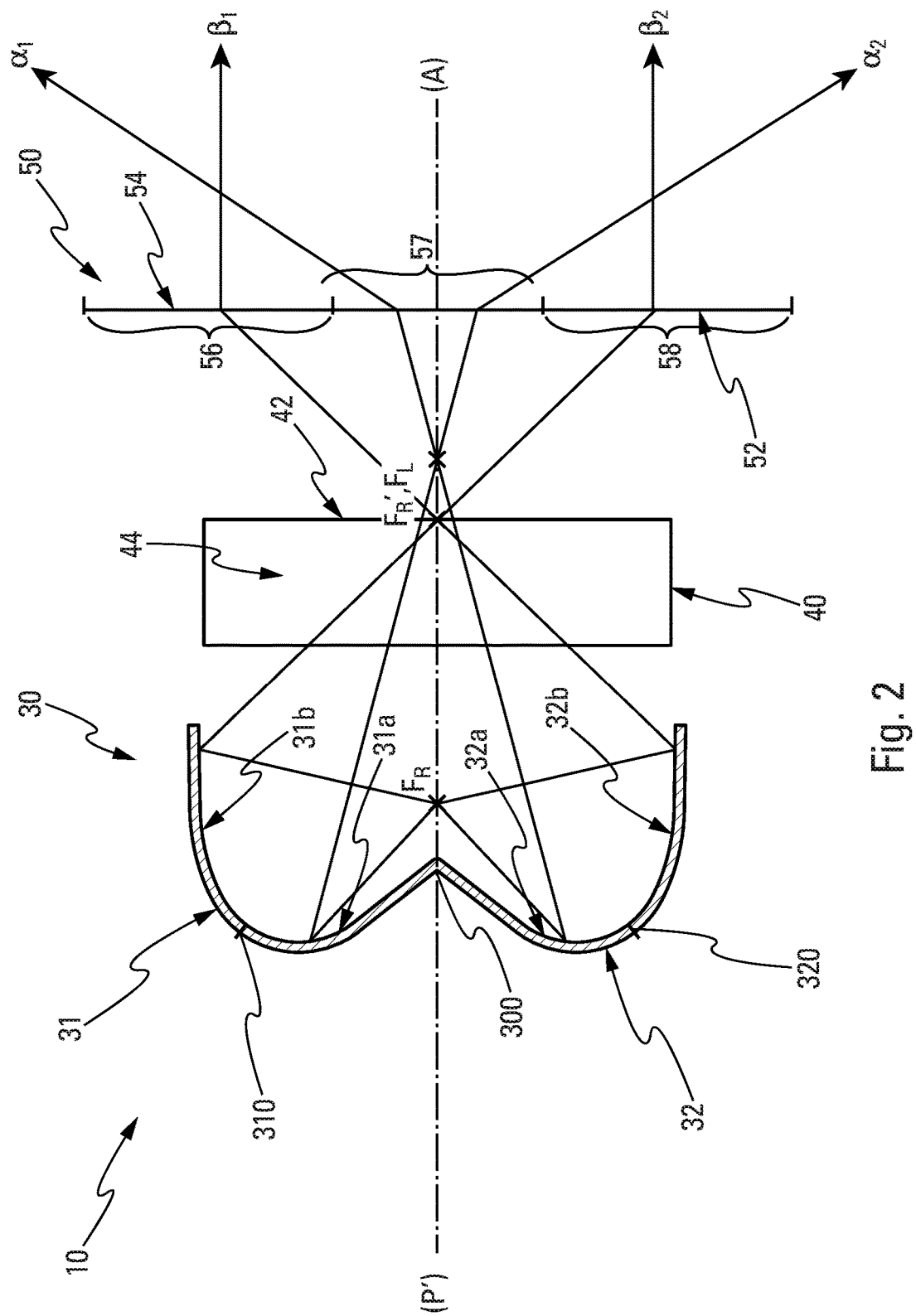
FIG. 2 is a top schematic view of the cut-off device, of the projection optic and of a horizontal section of the reflector of the optical module, according to the invention.

As is particularly shown in FIG. 2, the projection optic 50 has a longitudinal optical axis A, on which a single object focal point $F_L$ is arranged. The projection optic 50 is designed to be passed through by the light beams emitted by the light source 20. In particular, the light beams passing via the object focal point $F_L$ of the projection optic 50 are projected ad infinitum, parallel to the optical axis A.

The projection optic 50 is shown herein as being a converging lens particularly comprising a first face, called inlet face 52, and a second face, called outlet face 54. The optical module 10 is designed so that the light rays emitted by the light source 20 enter the projection optic 50 via its inlet face 52 and exit via its outlet face 54.

According to a variant of the invention, not shown, the projection optic is formed by an objective lens comprising a plurality of lenses.

The reflector 30 is arranged along the path of the light rays between the light source 20 and the projection optic 50. The reflector 30 is designed to reflect the light rays coming from the light source 20 towards the projection optic 50.

As is particularly shown in FIG. 3, the reflector 30 in this case comprises two cavities 31 and 32. The two cavities 31 and 32 are arranged on either side of the optical axis A. Furthermore, the two cavities 31 and 32 are arranged on either side of a longitudinal vertical plane P' comprising the optical axis A. Each cavity 31 and 32 comprises a reflection surface designed to reflect the light rays coming from the light source 20 towards the projection optic 50. The reflection surfaces of each cavity 31 and 32 are substantially symmetrical relative to the vertical plane P'.

It is to be noted that the emission axis S of the light source 20 in this case is included in the plane P'. The light source 20 is particularly arranged to emit light rays towards the reflection surfaces of the cavities 31 and 32 of the reflector 30.

The two reflection surfaces of the cavities 31 and 32 of the reflector 30 in this case are joined. They are also rigidly connected to each other. A junction zone 300 thus exists between the reflection surfaces of the cavities 31 and 32. This junction zone 300 in this case coincides with the plane P'.

It is to be noted that the plane P' substantially represents a plane of symmetry orthogonal to the reflector 30.

The reflector 30 in this case forms one and the same part.

The reflection surface of each cavity 31, 32 is itself divided into a plurality of parts. In particular, in this case, the reflection surface of each cavity 31, 32 comprises a first part 31a, 32a, called central part, and a second part 31b, 32b, called lateral part. The central 31a, 32a and lateral 31b, 32b parts of each cavity 31, 32 are respectively joined to each other at a zone 310, 320, which is also called discontinuity 310, 320, of the cavity 31, 32. The discontinuity 310, 320 in this case extends along a continuous curved line between the lateral part 31b, 32b and the central part 31a, 32a of each cavity 31, 32.

The central parts 31a, 32a of each cavity 31, 32 are joined to each other at the aforementioned junction zone 300 between the two cavities 31, 32. In other words, the cavities 31, 32 of the reflector 30 are joined to each other at their respective central parts 31a, 32a.

The central parts 31a, 32a of each cavity 31, 32 in this case are arranged along the plane P', on either side of said plane. It is to be noted that the central part 31a of the cavity 31 and the central part 32a of the cavity 32 are symmetrical to each other relative to the plane P'.

The lateral parts 31b, 32b of each cavity 31, 32 are each transversely arranged at a distance from the plane P'. Thus, each lateral part 31b, 32b is transversely separated from the plane P' by the associated central part 31a, 32a. It is to be noted that the lateral part 31b of the cavity 31 and the lateral part 32b of the cavity 32 can be substantially symmetrical to each other relative to the plane P'.

The lateral part 31b, 32b and the central part 31a, 32a of each cavity 31, 32 each have different optical properties. In other words, the lateral parts 31b, 32b of the cavities 31 and 32 are designed to variously reflect the light beams coming from the light source 20 relative to the associated central parts 31a, 32a.

In particular, in each cavity 31, 32, the lateral part 31b, 32b has an object focal point $F_R$ and a single image focal point $F_R'$. In this case, the object focal point $F_R$ coincides with the light source 20. The image focal point $F_R'$, for its part, substantially coincides with the object focal point $F_L$ of the projection optic 50. More specifically, it is to be noted that, particularly in order to adapt the light beam projected by the projection optic 50, the image focal point $F_R'$ can be slightly transversely offset relative to the object focal point $F_L$.

In this way, light beams $\beta_1$, $\beta_2$ coming from the light source 20 and reflected on one or the other of the lateral parts 31b, 32b of the reflector 30 pass via the object focal point $F_L$ of the projection optic 50 and are thus projected, after they pass via the projection optic 50, ad infinitum, i.e. parallel to the optical axis A.

Furthermore, in each cavity 31, 32, the central part 31a, 32a comprises an object focal point and a plurality of image focal points. By way of an illustration, among these image focal points, three image focal points $F_1$, $F_2$, $F_3$ are shown in FIG. 2. The object focal point of the central part 31a, 32a is the same as that of the lateral part 31b, 32b and in this case coincides with the light source 20. The image focal points of the central part 31a, 32a are distinct from the object focal point $F_L$ of the projection optic 50. In particular, in this case, the image focal points of the central part 31a, 32a are aligned, or substantially aligned, along the optical axis A and are offset along the optical axis A relative to the object focal point $F_L$ of the projection optic 50.

In this way, light rays $\alpha_1$, $\alpha_2$ coming from the light source 20 and reflected on one of the central parts 31a, 32a of each cavity 31, 32 do not pass via the object focal point $F_L$ of the projection optic 50. The light rays $\alpha_1$, $\alpha_2$ reflected on the central parts 31a, 32a are consequently projected at the exit of the projection optic 50 in an oblique manner relative to the optical axis A. Furthermore, the central parts 31a, 32a are imaged in a blurred manner ad infinitum.

In each cavity 31, 32, the lateral part 31b, 32b and the central part 31a, 32a of the reflection surface have different shapes.

In this case, the central 31a, 32a and lateral 31b, 32b parts of the cavities 31, 32, whilst having different shapes, each substantially have the shape of an ellipsoid portion. In other words, the central part 31a, 32a and the lateral part 31b, 32b of the same reflection surface in this case each have a different shape of ellipsoid portion.

Furthermore, as can be particularly seen in FIG. 2, the central 31a, 32a and lateral 31b, 32b parts of the cavities 31, 32 each have a section, said section being perpendicular to the plane P', which is in the shape of, or is substantially in the shape of, an ellipsoid portion.

It is to be noted that the lateral part 31b, 32b of each reflection surface can have a complex shape to allow for the presence of a plurality of image focal points. For example, it is segmented into a plurality of ellipsoid portions each having a different image focal point.

In the example described thus far, each cavity 31, 32 comprises two distinct parts, namely the central part 31a, 32a and the lateral part 31b, 32b. By way of a variant, not shown, the reflection surface of each cavity 31, 32 can be divided into at least three distinct parts, each of said distinct parts performing a different illuminating function.

The cut-off device 40 in this case is a reflective plate. By way of a variant, not shown, the cut-off device can be a shield. The reflective plate 40 particularly comprises a reflective surface 44, for example, a mirror. The reflective surface 44 is designed to reflect part of the light rays towards the projection optic 50 that have been reflected by the reflector 30. The reflective surface 44 is partly delimited by a cut-off edge 42 of the reflective plate 40.

In this case, the reflective surface 44 of the reflective plate 40 is flat. The reflective surface 44 extends orthogonal to the plane P' of the reflector. In particular, the reflective surface 44 is included in a plane P that comprises the optical axis A and is perpendicular to the plane P'. In other words, the plane P is an axial plane perpendicular to the plane P'.

The cut-off device 40 prevents a driver located in front of the optical module 10 from being dazzled thereby. To this end, the reflective surface 44 is designed to deflect some of the light rays coming from the reflector 30 towards one part of the projection optic 50 as opposed to another part. Furthermore, the reflective surface 40 allows the power of the light beam propagating towards the projection optic 50 to be substantially multiplied by two.

The reflective plate 40 is arranged within the optical module 10 so that the cut-off edge 42 is arranged at the object focal point $F_L$ of the projection optic 50. In this case, the cut-off edge 42 passes via the object focal point $F_L$ of the projection optic 50. It is to be noted that the cut-off edge 42 in this case is straight and extends perpendicular to the optical axis A. The cut-off edge also extends perpendicular to the plane P'.

Besides this arrangement of the cut-off edge 42, the optical module 10 is designed so that the projection optic 50 projects an image from the cut-off edge 42 ad infinitum.

As shown in FIG. 4, several regions are defined on the inlet face 52 of the projection optic 50. In this case, in particular, the inlet face 52 of the projection optic 50 comprises a central part 57 and two lateral parts 56, 58, transversely arranged on either side of the central part 57.

The central part 57 of the projection optic 50 in this case corresponds to a region of the projection optic 50 located in the vicinity of the intersection of the inlet face 52 of the projection optic 50 with the plane P'. The central part 57 of the projection optic 50 extends substantially from one edge of the projection optic 50 to another, along said intersection.

The two lateral parts 56, 58 of the inlet face 52 themselves correspond to regions of the inlet face 52 of the projection optic 50 transversely located on either side of the central part 57.

On the one hand, the reflector 30 is designed and arranged so that the light rays $\alpha_1$, $\alpha_2$ coming from the light source 20 and reflected by the central parts 31a, 32a of the reflector 30 subsequently pass via the central part 57 of the projection optic 50.

On the other hand, the reflector 30 is also designed so that the light rays $\beta_1$, $\beta_2$ coming from the light source 20 and reflected by the lateral parts 31b and 32b of the reflector 30 respectively pass via the lateral parts 58 and 56 of the projection optic 50.

Once the optical module 10 is installed in the motor vehicle, the optical axis A of the projection optic 50 extends horizontally. The plane P' extends vertically. The plane P, for its part, extends horizontally. The reflective surface 44 extends horizontally.

Furthermore, once the optical module 10 is installed in the motor vehicle, the central part 57 of the projection optic 50 extends vertically along the plane P'. The inlet face 52 is substantially perpendicular both to the plane P and to the plane P'. The lateral parts 56 and 58 of the projection optic 50 are respectively arranged on the left and on the right of the central part 57 of the projection optic 50 when it is viewed from its inlet face 52. The light source 20 is arranged substantially under the reflection surfaces of the reflector 30.

The light rays $\alpha_1$, $\alpha_2$ coming from the light source 20 passing via the central parts 31a, 32a of the reflector 30, then via the central part 57 of the projection optic 50, are designed to illuminate the width of the road in the vicinity of the vehicle when the vehicle is moving. The light rays $\beta_1$, $\beta_2$ passing via the lateral parts 31b and 32b of the reflector 30, then respectively via the lateral parts 58 and 56 of the projection optic 50, are, for their part, designed for illuminating beyond and in front of the motor vehicle.

As previously explained, the light rays $\beta_1$, $\beta_2$ passing via the lateral parts 56 and 58 of the projection optic 50 help to create the image of the cut-off edge 42 of the reflective plate 40 ad infinitum. Advantageously, these light rays $\beta_1$, $\beta_2$ are then combined in a light beam produced at the exit of the projection optic 50, these rays $\beta_1$, $\beta_2$ being projected ad infinitum. The passage of these light rays $\beta_1$, $\beta_2$ via one and the other of the lateral parts 56 and 58 of the projection optic 50 thus allows the visual impedance caused by any chromatic aberrations to be reduced.

In other words, chromatic aberrations are certainly generated at each lateral part 56 and 58 of the projection optic 50, but combining light rays $\beta_1$, $\beta_2$ ad infinitum, after they pass via said lateral parts 56 and 58 of the projection optic 50, allows them to be superimposed ad infinitum and thus allows the impedance caused by the chromatic aberrations to be reduced.

The invention claimed is:

1. Optical module, particularly for a motor vehicle, comprising:
    a light source emitting light rays;
    a projection optic having an optical axis and an object focal point $F_L$;
    a reflector comprising two cavities each comprising a reflection surface for reflecting the light rays originating from the light source towards the projection optic;
    a cut-off device designed to mask part of the light beam, the cut-off device comprising a transverse cut-off edge, the cut-off edge being arranged at the object focal point $F_L$ of the projection optic;
    each of the cavities being arranged on either side of an axial plane comprising the optical axis, the reflection surface of each cavity being divided into a lateral part and a central part of the cavity, the central part of each cavity being arranged along the axial plane, the lateral part of each cavity being transversely located at a distance from the axial plane, each reflection surface having a single object focal point that coincides with the light source,
    wherein the lateral part of each cavity has a single image focal point coinciding or substantially coinciding with the object focal point of the projection optic, and
    the central part of each cavity comprises a plurality of image focal points distinct from the object focal point of the projection optic,
    the cavities being designed so that the light rays reflected by the central parts of the reflector pass through a central part of the projection optic, the central part of the projection optic extending in the vicinity of an intersection between the projection optic and the plane,
    the light rays reflected by the lateral parts of the reflector passing through two lateral parts of the projection optic transversely located on either side of the central part of the projection optic.

2. Optical module according to claim 1, wherein the reflection surfaces of the cavities are symmetrical or substantially symmetrical relative to the plane.

3. Optical module according to claim 2, wherein the cut-off device is a reflective plate comprising a reflective surface, particularly coinciding with an axial plane transverse and perpendicular to the plane, designed to reflect part of the light rays from the cavities towards the projection optic.

4. Optical module according to claim 2, wherein the cut-off device is a shield designed to stop the propagation of part of the light rays towards the projection optic.

5. Optical module according to claim 2, wherein the image focal points of the central parts of each cavity are substantially aligned along the optical axis.

6. Optical module according to claim 2, comprising two light sources, each light source emitting a light beam respectively towards one or the other of the cavities.

7. Optical module according to claim 2, wherein the lateral part and the central part of each cavity each have an ellipsoid shape.

8. Optical module according to claim 2, designed so that the light rays passing via the lateral parts of each cavity propagate parallel to the optical axis after they pass via the projection optic so as to illuminate ad infinitum, the light rays passing via the central parts of each cavity being projected in a direction that is not parallel to the optical axis after they pass via the projection optic so as to illuminate laterally on either side of the plane.

9. Optical module according to claim 1, wherein the cut-off device is a reflective plate comprising a reflective surface, particularly coinciding with an axial plane transverse and perpendicular to the plane, designed to reflect part of the light rays from the cavities towards the projection optic.

10. Optical module according to claim 9, wherein the light source has a main emission axis perpendicular to the plane.

11. Optical module according to claim 9, wherein the cut-off device is a shield designed to stop the propagation of part of the light rays towards the projection optic.

12. Optical module according to claim 9, wherein the image focal points of the central parts of each cavity are substantially aligned along the optical axis.

13. Optical module according to claim 9, comprising two light sources, each light source emitting a light beam respectively towards one or the other of the cavities.

14. Optical module according to claim 9, wherein the lateral part and the central part of each cavity each have an ellipsoid shape.

15. Optical module according to claim 9, designed so that the light rays passing via the lateral parts of each cavity propagate parallel to the optical axis after they pass via the projection optic so as to illuminate ad infinitum, the light rays passing via the central parts of each cavity being projected in a direction that is not parallel to the optical axis after they pass via the projection optic so as to illuminate laterally on either side of the plane.

16. Optical module according to claim 1, wherein the cut-off device is a shield designed to stop the propagation of part of the light rays towards the projection optic.

17. Optical module according to claim 1, wherein the image focal points of the central parts of each cavity are substantially aligned along the optical axis.

18. Optical module according to claim 1, comprising two light sources, each light source emitting a light beam respectively towards one or the other of the cavities.

19. Optical module according to claim 1, wherein the lateral part and the central part of each cavity each have an ellipsoid shape.

20. Optical module according to claim 1, designed so that the light rays passing via the lateral parts of each cavity propagate parallel to the optical axis after they pass via the projection optic so as to illuminate ad infinitum, the light rays passing via the central parts of each cavity being projected in a direction that is not parallel to the optical axis after they pass via the projection optic so as to illuminate laterally on either side of the plane.

* * * * *